No. 763,876. PATENTED JUNE 28, 1904.
F. GEIGER.
GAS CHECK.
APPLICATION FILED MAR. 3, 1904.
NO MODEL.
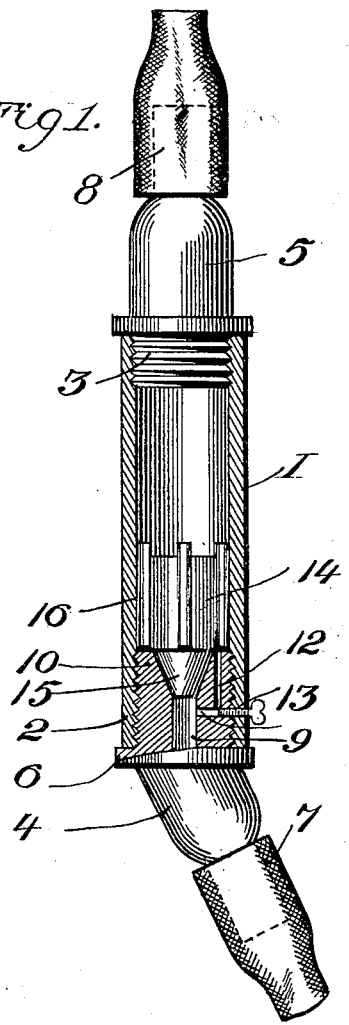
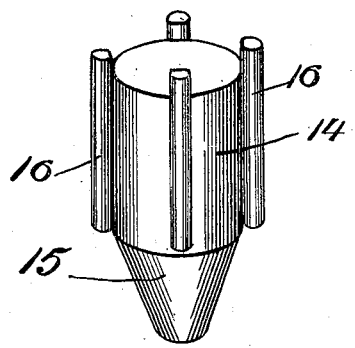
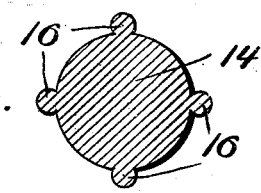
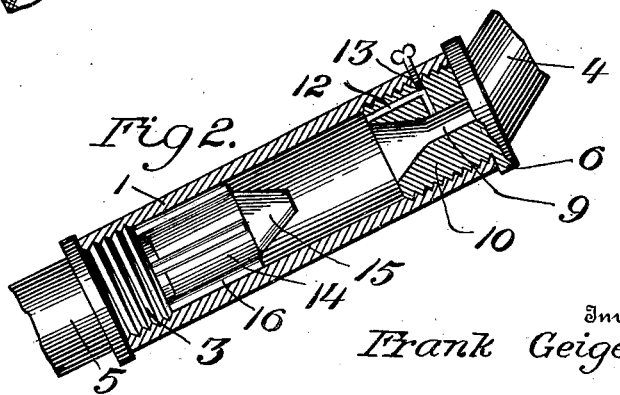
Witnesses
Phil E. Barnes.
Chas. S. Hyer.
Inventor
Frank Geiger
By Victor J. Evans
Attorney No. 763,876. Patented June 28, 1904.

UNITED STATES PATENT OFFICE.

FRANK GEIGER, OF BROOKLYN, NEW YORK.

GAS-CHECK.

SPECIFICATION forming part of Letters Patent No. 763,876, dated June 28, 1904.

Application filed March 3, 1904. Serial No. 196,353. (No model.)

*To all whom it may concern:*

Be it known that I, FRANK GEIGER, a citizen of the United States, residing at Brooklyn, in the county of Kings and State of New York, have invented new and useful Improvements in Gas-Checks, of which the following is a specification.

This invention relates to automatically-operating gas-check means having a general application, but particularly in connection with soldering apparatus. In factories and other places where a specialty of brazing and soldering brass, aluminium, white-metal, &c., is pursued the soldering apparatus usually comprises two pieces of flexible piping, one piece being connected to a blower in constant operation and the other to a source of gas-supply. When the soldering operation is pursued with this apparatus, the gas and air pipes are connected to a copper tube forming a mixing-chamber and from which a blue flame is delivered to the work to avoid soiling the latter. In this apparatus it is ordinarily necessary to permit the gas to continue to burn when the soldering operation is not constantly carried on with a very great waste. The present automatic check means obviates this disadvantage by shutting off the flow of gas to the soldering-tube when the latter and the pipes connecting therewith are laid down on some support at intervals when it is not desired to cause the flame to impinge on the work. The improved automatic check means has structural features which will cause the flame therein to become almost extinguished when in a position of disuse; but as soon as it is raised and disposed in a position for use the full flow of gas and air is permitted and the flame will be caused to assume its normal condition for the soldering and brazing operations.

In the drawings, Figure 1 is an elevation of the improved gas-checking means shown broken away in part. Fig. 2 is a view substantially similar to Fig. 1, illustrating the position of the checking means when fully open. Fig. 3 is a detail perspective view of a check-valve embodied in the checking means. Fig. 4 is a horizontal section through the valve shown by Fig. 3.

Similar numerals of reference are employed to indicate corresponding parts in the several views.

The numeral 1 designates a cylindrical body having the opposite ends internally screw-threaded to removably receive the screw-threaded shanks 2 and 3, respectively, of an inlet-nozzle 4 and an outlet or feeding nozzle 5. The inlet-nozzle 4 is disposed at an angle of inclination relative to its shank 2 for convenience in arranging the improved check means on a rest when not in use and also in facilitating disposition of the latter to cause a check-valve therein to freely gravitate, as will be more fully hereinafter explained. Between each nozzle and its stem a flange 6 is located to bear against the end of the cylinder 1, and both nozzles have reduced terminals to respectively receive a supply-piping 7 and a feed-pipe 8, the latter being connected to the mixing-cylinder, blast-pipe, or soldering tube and tip. The pipe 7 extends to or forms a part of the branch pipes adapted to convey air and gas in proportions. It will be understood, however, that aside from the specific uses mentioned the improved checking means may be employed for other purposes where found applicable.

Both shanks 2 and 3 have bores extending centrally therethrough similar to that indicated by the reference-numeral 9 in the shank 2. The shank 2 has in addition a valve-seat 10 at its inner terminal into which the bore 9 extends, and at a distance from the reduced portion of the valve-seat a transverse by-pass 11 communicates with the bore 9 and has a longitudinal branch 12 extending through the inner end of the said shank 2. The flow of gas and air through the by-pass 11 and its branch 12 is controlled by a screw-valve 13, projecting through and operative from the exterior of the cylinder 1. Slidably mounted in the cylinder 1 is a gravitating check-valve 14, having a reduced extremity 15, adapted to snugly fit in the valve-seat 10, the main body of the valve 14 being materially less in diameter than the inner diameter of the cylinder 1 and provided with longitudinally-disposed cylindrical ribs 16, arranged at intervals thereon and projecting beyond the end thereof which is adapted to approach the shank 2, the projecting extremities of the ribs being adapted to strike against the inner terminal of the shank 3 and prevent closing the bore in the latter. By this means the gas and air in different quantities that is supplied to the cylinder 1 will be permitted to pass out through the nozzle 5 into the pipe 8, especially when the device is in the position shown by Fig. 2 or so that the valve 14 is clear of the seat 10 and bore 9 of the shank 2. When the valve is closed and engaging said shank 2, as shown by Fig. 1, the longitudinal branch 12 of the by-pass will not be obstructed, and a small portion of the gas and air will be permitted to enter the cylinder 1, and thus maintain a small flame in the brazing or soldering tube and provide for a minimum consumption of the gas under such conditions. The ribs 16 do not extend fully to the terminal of the body 1 adjacent the reduced extremity 15, and hence though the valve as an entirety might revolve the by-pass outlet into the cylinder 1 will never be closed by any of the rib ends.

From the foregoing it will be seen that the construction of the improved check means is simple and that its operation will be automatic.

It will be understood that changes in the proportions, dimensions, and minor details may be resorted to without in the least departing from the spirit of the invention.

Having thus fully described the invention, what is claimed as new is—

1. In an automatic check means of the class set forth, the combination of a cylinder having nozzles with shanks extending thereinto, both shanks having bores through the center thereof and one provided with a valve-seat and a by-pass, and a gravitating valve disposed in the cylinder and having a reduced extremity to engage said seat and longitudinal ribs projecting beyond the end of the body of the valve opposite that having the reduced extremity.

2. In an automatic check means of the class set forth, the combination of a cylinder, nozzles attached to opposite extremities of said cylinder and having portions projecting into the latter, the said portions both being formed with bores and one of them having a valve-seat and a by-pass in communication with its bore, and a valve gravitatingly mounted in the cylinder and having a body of less diameter than the inner diameter of the latter, the said valve having a reduced extremity to engage the valve-seat, and longitudinal ribs projecting beyond the end of the body opposite that having the reduced extremity and terminating at a distance from the end of the body having the reduced extremity.

3. In an automatic check means of the class set forth, the combination of a cylindrical body having end closures with central bores therethrough, one of said closures also having a valve-seat and a by-pass communicating with its bore, means adjustably extending into the by-pass for regulating the flow of gas through the latter, and a gravitating valve having a reduced extremity to engage the valve-seat and provided with projections to contact with the closure opposite that having the valve-seat therein.

4. An automatic check device having a tubular body with end closures for connecting pipes, said closures being provided with openings communicating with the interior of the body and one closure in addition having a valve-seat and a by-pass, and a valve freely slidable in the said body and having means to engage the valve-seat and projecting devices at the end thereof opposite said means to contact with the opposite closure to prevent shutting off the opening in the latter.

In testimony whereof I affix my signature in presence of two witnesses.

FRANK GEIGER.

Witnesses:
 HERMAN STERN,
 ADOLPH BAUSER.